United States Patent [19]

Hecht

[11] Patent Number: 5,468,008
[45] Date of Patent: Nov. 21, 1995

[54] LOW DECK TRAILER

[76] Inventor: Michael R. Hecht, 2075 Lakewood Rd., Toms River, N.J. 08755

[21] Appl. No.: 285,089

[22] Filed: Aug. 3, 1994

[51] Int. Cl.[6] .............................. B60D 3/00; B60D 63/06
[52] U.S. Cl. .......................... 280/638; 280/656; 280/789; 280/163
[58] Field of Search ............................ 293/117; 280/789, 280/638, 656, 163, 164, 165, 166

[56] References Cited

U.S. PATENT DOCUMENTS

| | | | |
|---|---|---|---|
| 2,476,814 | 7/1949 | Carmack et al. | 280/163 |
| 2,820,667 | 1/1958 | Benaroya et al. | 280/163 |
| 4,561,671 | 12/1985 | DeWitt et al. | 280/656 |

FOREIGN PATENT DOCUMENTS 1781124  12/1992  U.S.S.R. ................................ 280/789

*Primary Examiner*—Mitchell J. Hill

[57] ABSTRACT

A low deck trailer comprising of a rigid frame adapted to be towed by a motor vehicle, the frame having a front, back and sides with upper and lower surface. Tires are secured to and disposed under the frame, each tire having a diameter of between about 14 and 15 inches with its center beneath the frame and its upper extent beneath the upper surface of the frame, the tires being located closer to the rear end than the front end. An axle has two ends coupled beneath the sides of each end having a tire coupled thereto the frame for supporting the axle. A step has a horizontal long leg coupled to the rear end of the frame extending away from the frame at an elevation beneath the frame.

5 Claims, 4 Drawing Sheets

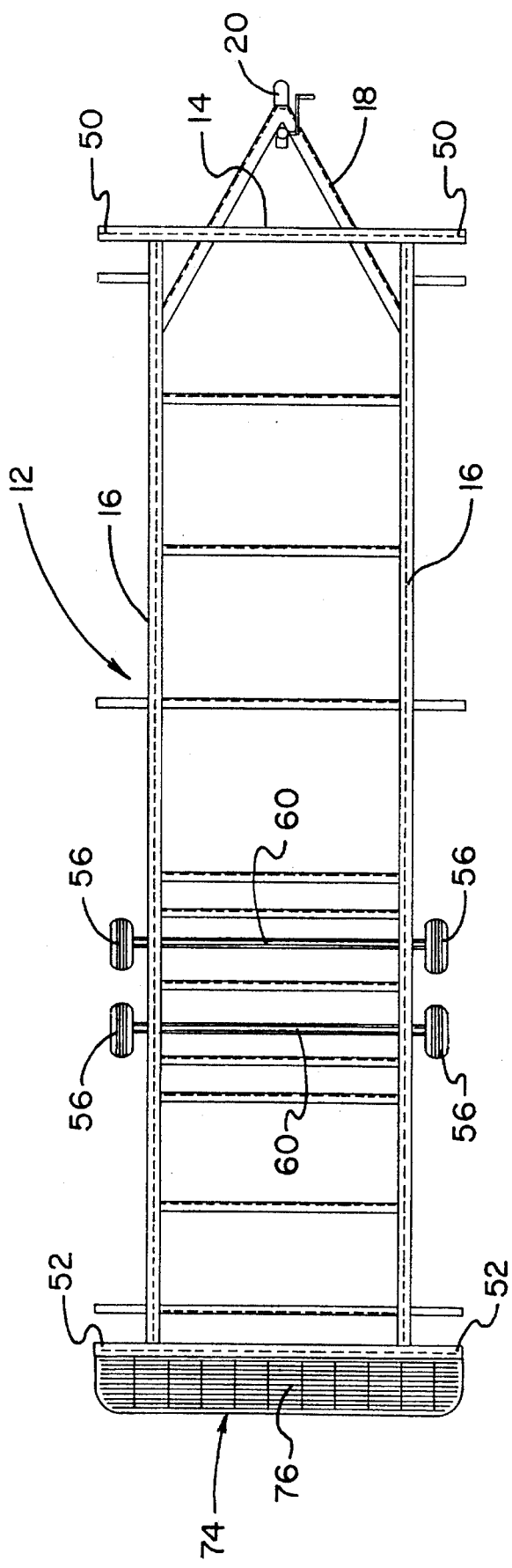
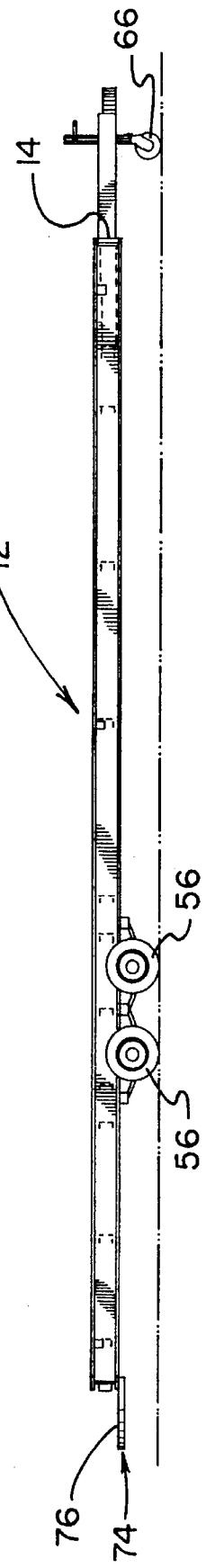
FIG. 2
FIG. 3

LOW DECK TRAILER

BACKGROUND OF THE INVENTION

1. Field of the Invention

The present invention relates to a trailer and more particularly pertains to a low deck trailer with a rear step for receiving items to be stored.

2. Description of the Prior Art

The use of trailers is known in the prior art. More specifically, trailers heretofore devised and utilized for the purpose of carrying items to be transported are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,448,878 to Schindler discloses a low bed trailer.

U.S. Pat. No. 4,006,913 to Rimhagen discloses a low height semi-trailer.

U.S. Pat. No. 4,415,181 to McCall discloses a low ground clearance trailer.

U.S. Pat. No. 4,991,872 to Richardson discloses a low-bed trailer suspension system.

Lastly, U.S. Pat. No. 5,013,056 to Lindoll discloses a low load angle step deck trailer having suitable undercarriage.

While these devices fulfill their respective, particular objective and requirements, the aforementioned patents do not describe a low deck trailer that holds a conventional 18-wheeler or Sealand type container at a low elevation above the ground.

In this respect, the low deck trailer according to the present invention substantially departs from the conventional concepts and designs of the prior art, and in doing so provides an apparatus primarily developed for the purpose of storing items at any easy to access height.

Therefore, it can be appreciated that there exists a continuing need for a new and improved low deck trailer which can be used for conveniently storing items and what may be transported. In this regard, the present invention substantially fulfills this need.

SUMMARY OF THE INVENTION

In the view of the foregoing disadvantages inherent in the known types of trailers now present in the prior art, the present invention provides an improved low deck trailer. As such, the general purpose of the present invention, which will be described subsequently in greater detail, is to provide a new and improved low deck trailer and method which has all the advantages of the prior art and none of the disadvantages.

To attain this, the present invention essentially comprises a low deck trailer comprising of a rigid and essentially rectangular metallic frame having a front end, a rear end, two parallel sides, a top surface, a bottom surface and an edge therearound, the front end having a forwardly extending V-shaped extension with a hitch disposed thereon for being towed by a motor vehicle. A rigid metallic container is disposed on the top surface of the frame and adapted for receiving items to be stored. The container comprises four vertical plates coupled together end to end to define a rectangular configuration having a front wall, a rear wall, two parallel sidewalls with an upper peripheral edge therearound, a lower peripheral edge therearound, and a space therebetween, the rear wall further having an aperture with doors coupled thereto to allow access to the space through the aperture when opened and to prevent access to the space when closed, a first horizontal plate disposed above the space in contact with the upper peripheral edge to define a roof, and a second horizontal plate disposed below the space in contact with the lower peripheral edge to define a deck for holding items to be stored. Lateral supports extend outwardly from the sides of the frame at forward, rearward and intermediate locations. Four tires are secured to and disposed under the frame, each tire having a diameter of between about 14 and 15 inches with its center beneath the frame and its upper extent beneath the upper surface of the frame, the tires being located closer to the rear end than the front end. Two parallel and spaced axles are provided, each axle having two ends, with springs coupled beneath the sides of each end and having a tire coupled thereto the frame for supporting the axles. A fifth wheel is coupled to a forward extent of the V-shaped frame with an adjustment mechanism to vary the height thereof. A step has a horizontal long leg coupled to the rear end of the frame extending away from the frame at an elevation beneath the frame.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved low deck trailer which may be easily and efficiently manufactured and marketed.

It is a further object of the present invention to provide a new and improved low deck trailer which is of durable and reliable construction.

An even further object of the present invention is to provide a new and improved low deck trailer which is susceptible of a low cost of manufacture with regard to both materials and labor, and which accordingly is then susceptible of low prices of sale to the consuming public, thereby making such a low deck trailer economically available to the buying public.

Still yet another object of the present invention is to provide a new and improved low deck trailer which provides in the apparatuses and methods of the prior art some of the advantages thereof, while simultaneously overcoming some of the disadvantages normally associated therewith.

Even still another object of the present invention is to provide a new and improved low deck trailer for receiving items to be stored.

Even still another object of the present invention is to provide a new and improved low deck trailer for supporting conventional 18-wheeler or Sealand type containers.

Even still another object of the present invention is to provide a new and improved low deck trailer wherein the deck of the trailer is positioned at a small distance from the ground with an associated step to facilitate easy access.

Even still another object of the present invention is to provide a new and improved low deck trailer that can be used for stationary storage or can be moved from one location to another should the need arise.

Even still another object of the present invention is to provide a new and improved low deck trailer that may be unloaded without the use of a loading dock.

Lastly, it is an object of the present invention to provide an improved low deck trailer comprising a rigid frame adapted to be towed by a motor vehicle, the frame having a front, back and sides with upper and lower surface. Tires are secured to and disposed under the frame, each tire having a diameter of between about 14 and 15 inches with its center beneath the frame and its upper extent beneath the upper surface of the frame, the tires being located closer to the rear end than the front end. An axle has two ends coupled beneath the sides of each end having a tire coupled thereto the frame for supporting the axle. A step has a horizontal long leg coupled to the rear end of the frame extending away from the frame at an elevation beneath the frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top elevational view of the trailer shown in FIG. 1.

FIG. 3 is a side elevational view of the trailer shown in FIG. 2.

The same reference numerals refer to the same parts throughout the various Figures.

DESCRIPTION OF THE PREFERRED EMBODIMENT

Figure 1:
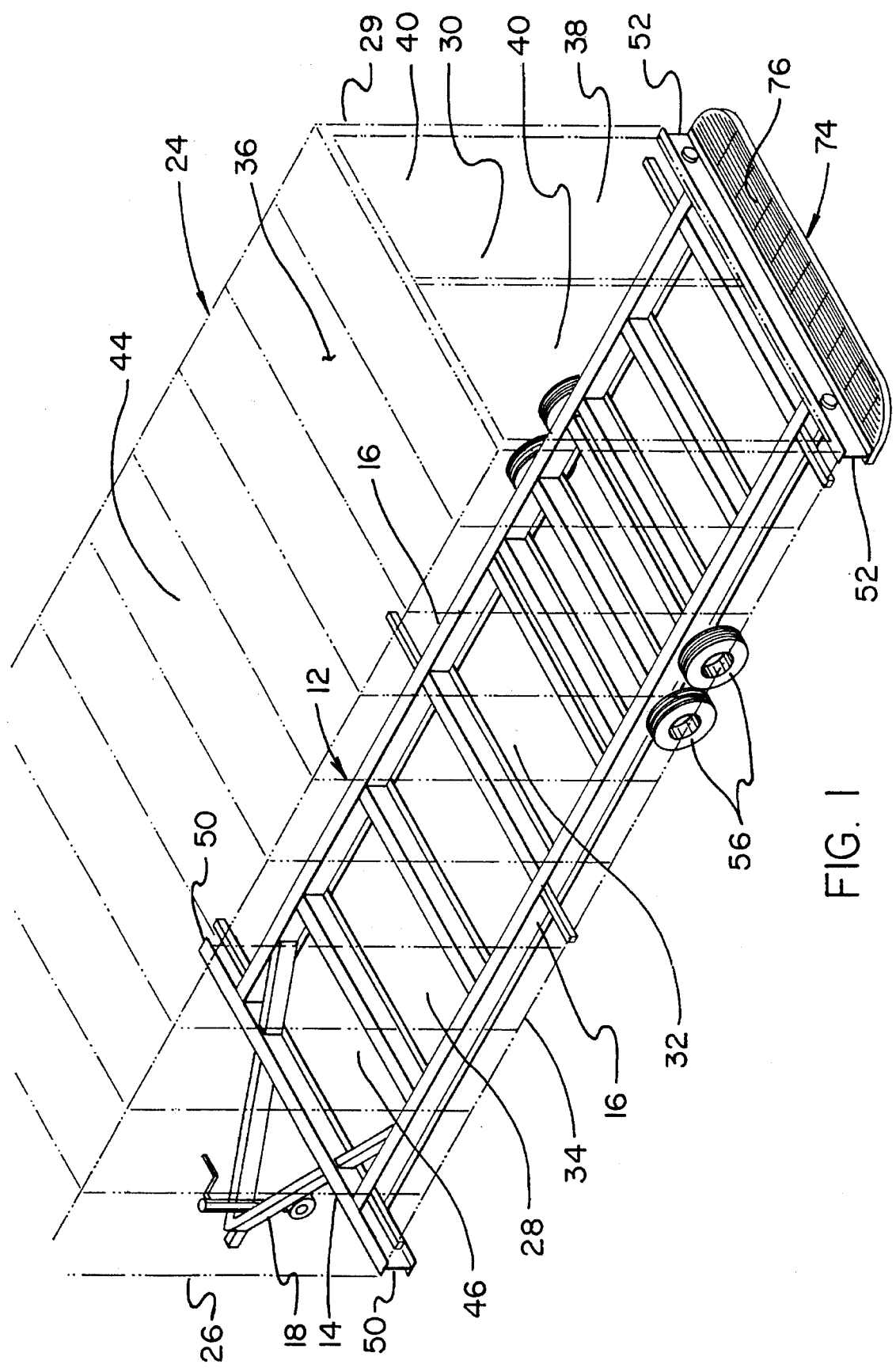
FIG. 1 is a perspective view of the preferred embodiment of the low deck trailer constructed in accordance with the principles of the present invention.
Figure 4:
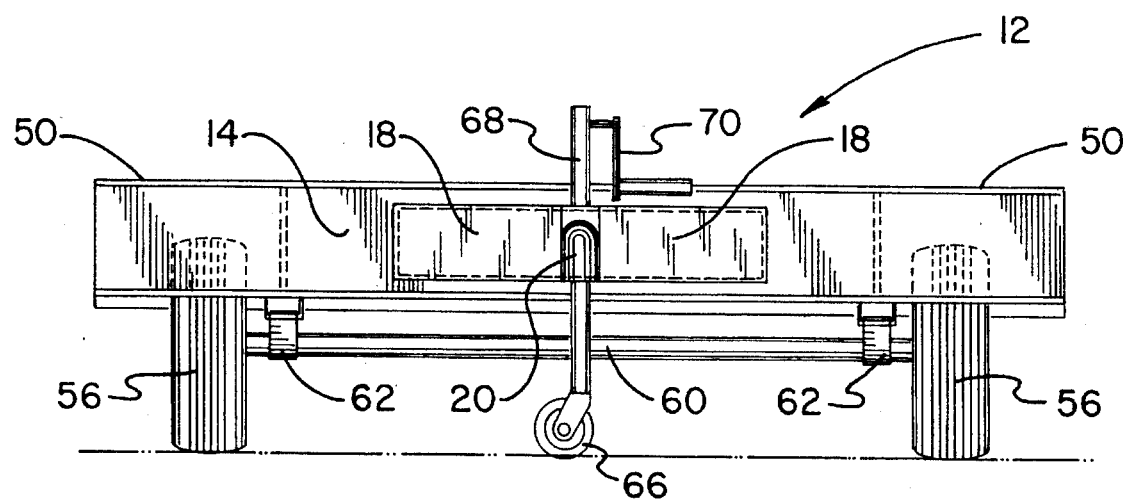
FIG. 4 is a front elevational view of the trailer shown in the prior Figure.
Figure 5:
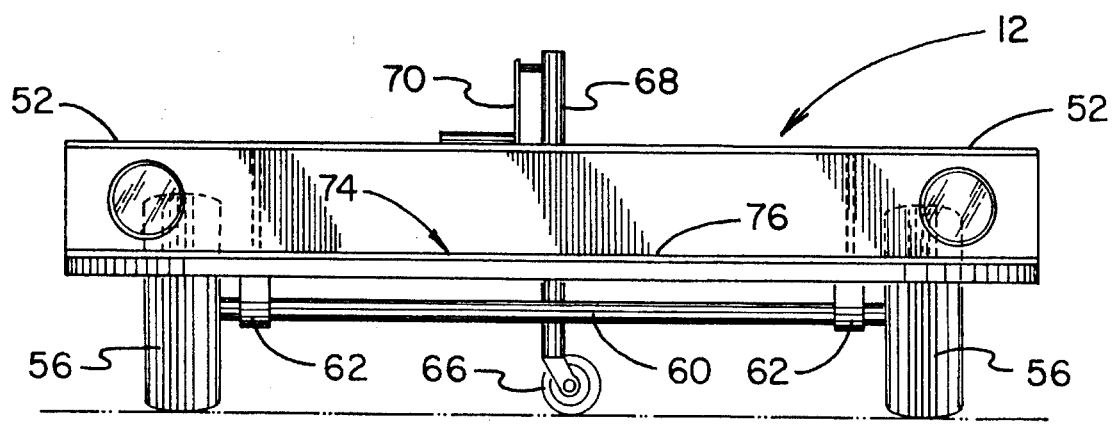
FIG. 5 is a rear elevational view of the trailer shown in the prior Figure.

With reference now to the drawings, and in particular, to FIG. 1 thereof, the preferred embodiment of the new and improved low deck trailer embodying the principles and concepts of the present invention and generally designated by the reference number 10 will be described.

Specifically, the present invention includes a frame, a container, clamps, tires, axles, an axial support structure, and a step. These components are interrelated to provide the intended function.

More specifically, it will be noted in the various Figures that the low deck trailer of the present invention is a system 10 comprised of a plurality of components. In their broadest context, such components include a frame, a container, lateral supports, wheels, axles, springs, and a step. Such components are individually configured and correlated with respect to each other so as to attain the desired objective.

More specifically, the present invention has as its central component a frame 12. The frame is rigid and essentially rectangular in configuration. The frame has a front end 14, a rear end, two parallel sides 16 forming a peripheral edge therearound. The front end has a forwardly extending V-shaped extension 18. A hitch 20 is disposed thereon at the forward end. This allows coupling to a motor vehicle for being transported.

Next provided is a rigid metallic container 24. The container is disposed on the top surface of the frame. It is adapted for receiving items to be stored. The container comprises four vertical plates 26, 28, 29 and 30. The plates are coupled together end to end to define a rectangular configuration having a front wall, a rear wall, and two parallel side walls. The walls form an upper peripheral edge 32 therearound and a lower peripheral edge 34 therearound. Within the walls is a space 36. The rear wall has an aperture 38. Doors 40 are located within the apertures being coupled at their lateral edges to the rear wall. The doors are for allowing access to the space through the apertures when opened. They also prevent access to the space when closed.

A first horizontal plate 44 is disposed above the space in contact with the upper peripheral edge of the walls. This defines a roof. A second horizontal plate 46 is disposed below the space in contact with the lower peripheral edge of the walls. This defines a deck for holding items to be stored.

Figure 8:
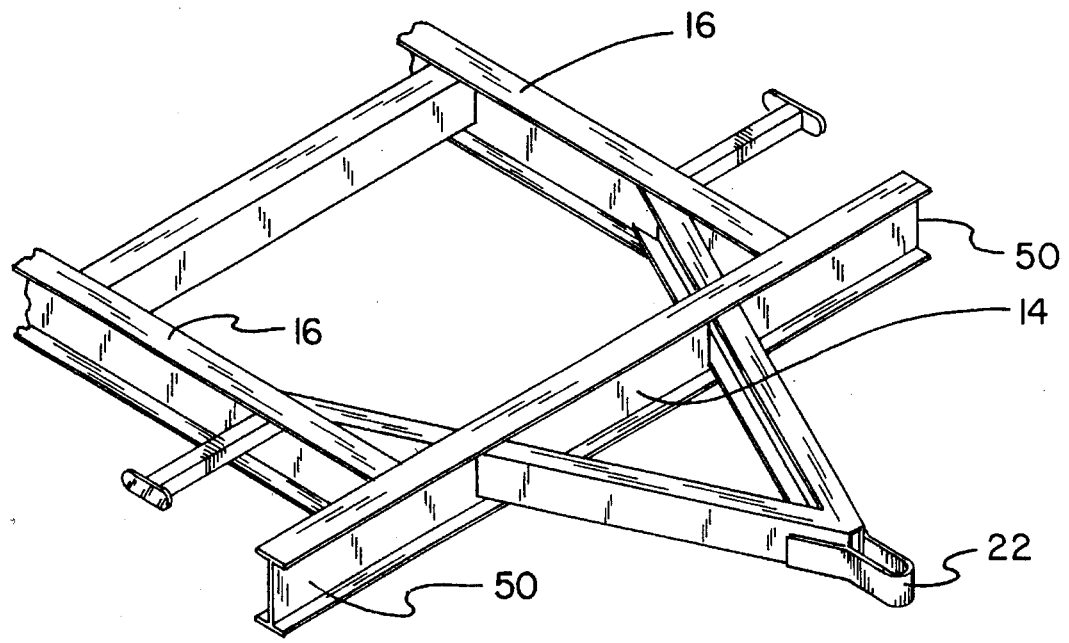
FIG. 8 is a perspective illustration of the front end of the trailer of the prior Figure.

The frame is adapted to provide additional lateral supports beneath a container thereon. This is done through lateral supports extending outwardly from the sides of the frame. These supports include a forward support 50, a rearward support 52, and an intermediate support at forward, rearward and intermediate locations with respect to the frame. Reflectors are provided at the ends of the support for safety purposes. Note FIG. 8.

The trailer is adapted for movement due to inclusion of four tires 56. The tires are secured to and disposed under the frame. Each tire has a small diameter of between about 14 and 15 inches, plus or minus 10 percent. The centers of the tires are located at an elevation beneath the frame. The upper surface of each tire is located at an elevation beneath the upper surface of the frame. The tires are located closer to the rear end than the front end of the frame to promote balance when being transported or stationary.

The tires are held in position through two parallel and spaced axles 60. Each axle has two ends. Each end has a tire rotatably coupled thereto. Springs 62 are coupled beneath the frame at the sides for supporting the axles.

A fifth wheel 66 is coupled to a forward extent of the V-shaped frame. The fifth wheel is secured through an adjustment mechanism 68 including a rotatable handle 70. The handle is adapted to be rotated by a user through a rack and pinon mechanism in a conventional manner to vary the height of the tire to effect the leveling of the frame and container when stored or during movement.

Figure 6:
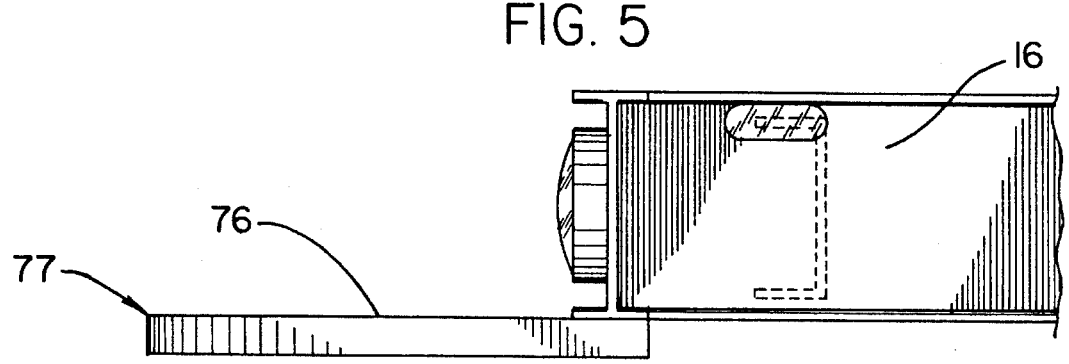
FIG. 6 is an enlarged side elevational view of the step at the rear end of the trailer shown in FIGS. 1, 2, 3 and 5.
Figure 7:
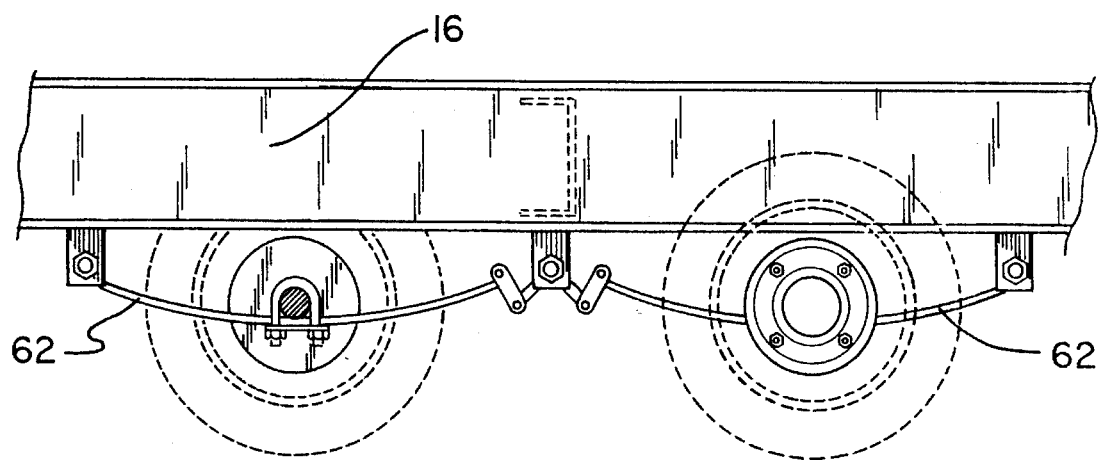
FIG. 7 is an enlarged side elevational view of the springs shown in FIGS. 1, 3, 4 and 5.

The last component of the system is a step 74. The step has a long horizontal leg providing a support surface 76. The leg has its forward end of its upper surface secured to the rearward extent of the frame. Note in particular FIG. 6. The leg extends away from the frame at an elevation beneath the frame.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as and desired to be protected by Letters Patent of the United States is as follows:

1. A new and improved low deck trailer comprising, in combination:

a rigid and essentially rectangular metallic frame having a front end, a rear end, two parallel sides, a top surface, a bottom surface and an edge therearound, the front end having a forwardly extending V-shaped extension with a hitch disposed thereon for being towed by a motor vehicle;

a rigid metallic container disposed on the top surface of the frame and adapted for receiving items to be stored, the container comprises four vertical plates coupled together end to end to define a rectangular configuration having a front wall, a rear wall, two parallel sidewalls with an upper peripheral edge therearound, a lower peripheral edge therearound, and a space therebetween, the rear wall further having an aperture with doors coupled thereto to allow access to the space through the aperture when opened and to prevent access to the space when closed, a first horizontal plate disposed above the space in contact with the upper peripheral edge to define a roof, and a second horizontal plate disposed below the space in contact with the lower peripheral edge to define a deck for holding items to be stored;

lateral supports extending outwardly from the sides of the frame at forward, rearward and intermediate locations;

four tires secured to and disposed under the frame, each tire having a diameter of between about 14 and 15 inches with its center beneath the frame and its upper extent beneath the upper surface of the frame, the tires being located closer to the rear end than the front end;

two parallel and spaced axles, each axle having two ends, with springs coupled beneath the sides of each end having a tire coupled thereto the frame for supporting the axles;

a fifth wheel coupled to a forward extent of the V-shaped frame with an adjustment mechanism to vary the height thereof; and a step having a horizontal long leg coupled to the rear end of the frame extending away from the frame at an elevation beneath the frame.

2. A low deck trailer comprising:

a rigid frame having a front end, a rear end and sides with upper and lower surfaces, the front end having a forwardly extending V-shaped extension with a hitch disposed thereon for being towed by a motor vehicle;

tires secured to an disposed under the frame, each tire having a diameter of between 14 and 15 inches with its center beneath the frame and its upper extent beneath the upper surface of the frame, the tires being located closer to the rear end than the front end;

an axle having two ends coupled beneath the sides of each end having a tire coupled thereto the frame for supporting the axle; and a step having a horizontal long leg coupled to the rear end of the frame extending away from the frame at an elevation beneath the frame.

3. The apparatus as set forth in claim 2 and further including a rigid metallic container disposed on the top surface of the frame and adapted for receiving items to be stored, the container comprises four vertical plates coupled together end to end to define a rectangular configuration having a front wall, a rear wall, two parallel sidewalls with an upper peripheral edge therearound, a lower peripheral edge therearound, and a space therebetween, the rear wall further having an aperture with doors coupled thereto to allow access to the space through the aperture when opened and to prevent access to the space when closed, a first horizontal plate disposed above the space in contact with the upper peripheral edge to define a roof, and a second horizontal plate disposed below the space in contact with the lower peripheral edge to define a deck for holding items to be stored.

4. The device as set forth in claim 2 and further including lateral supports extending outwardly from the sides of the frame at said front end, said rear end and at intermediate locations.

5. The apparatus as set forth in claim 2 and further including a fifth wheel coupled to a forward extent of the V-shaped frame with an adjustment mechanism to vary the height thereof.

* * * * *